United States Patent [19]

Whitcomb

[11] 4,056,135

[45] Nov. 1, 1977

[54] CLAMP ASSEMBLY

[75] Inventor: Paul H. Whitcomb, Attica, N.Y.

[73] Assignee: Eaton Yale Ltd., Canada

[21] Appl. No.: 724,143

[22] Filed: Sept. 17, 1976

[51] Int. Cl.² ............................................. A01G 23/08
[52] U.S. Cl. .............................. 144/2 Z; 144/309 AC
[58] Field of Search ................. 294/88, 104; 144/2 Z, 144/3 D, 309 AC

[56]    References Cited
    U.S. PATENT DOCUMENTS

| 3,618,647 | 11/1971 | Stuart, Jr. | 144/2 Z |
| 3,623,521 | 11/1971 | Shields | 144/2 Z |
| 3,924,667 | 12/1975 | McKenzie | 144/309 AC |
| 3,952,783 | 4/1976 | Windsor | 144/2 Z |

Primary Examiner—Othell M. Simpson
Assistant Examiner—W. D. Bray
Attorney, Agent, or Firm—Teagno & Toddy

[57] ABSTRACT

A processor clamp for a tree harvester. A first tree engaging surface is defined by an edge of a frame member upstanding from the processing boom of the harvester. A second tree engaging surface is defined by a movable clamp arm which is located beneath the first tree engaging surface in its open position to free the first surface of obstruction tending to interfere with a tree being positioned on the processing boom. According to another aspect of the invention, the operating cylinder for the movable clamp arm is located within a cavity formed by the frame members of the clamp assembly, and is thus protected from damage.

11 Claims, 4 Drawing Figures

CLAMP ASSEMBLY

The present invention relates to improved apparatus for harvesting trees, and more particularly to an improved clamp assembly for holding a tree during the processing thereof by a tree harvesting apparatus.

U.S. Pat. No. 3,894,568 discloses a tree harvester in which a felling head is used to hold a tree in position for delimbing and topping by means of a processing head travelling along a horizontal processing boom. One shortcoming of such a machine is that using the felling head to perform a clamping function in the processing phase of the harvesting cycle precludes working on more than one tree at a time.

A know means for enabling a harvester to work on more than one tree at a time is to provide a secondary clamp means associated with the processing boom so that the felling head can be freed to fell a second tree while a first tree is being processed. Examples of such machines are disclosed is U.S. Pat. Nos. 3,618,647 and 3,924,667.

One problem associated with prior art harvesters employing a secondary clamp is that of insuring the release of a processed tree from the clamp into a bunk on the machine or to the ground. Some depend on the release of the opposite end of the tree as the tree is topped to carry the tree out of the clamp, and some employ separate ejector means to positively release the tree from the clamp.

Another problem associated with such clamps is that the movable clamp element generally extends upwardly above the stationary element, in a position where it is likely to interfere with a tree being positioned on the processing boom.

It can be appreciated that while a tree must be securely clamped for processing, it must also be ejected from the clamp quickly and easily when processing is completed. Accordingly, it is an object of this invention to provide such a clamp in which both of these objectives are accomplished using a simple and trouble-free machine.

Another object of the invention is to provide a processor clamp in which a movable member securely holds the tree for processing but which permits the tree to roll free of the clamp by gravity when the movable member is released.

Another object of the invention is to provide a processor clamp which is capable of handling trees over a wide range of diameters with equal efficiency.

Another object of the invention is to provide a processor clamp in which the movable clamp arm is completely out of the way of a tree being deposited on the processing boom when the clamp is in its open position.

In order to meet the above objectives, the present invention provides a clamp assembly mounted on the processing boom of a tree harvester, which provides a stationary clamping surface angled downwardly toward a bunk mounted alongside the processing boom. A movable clamp element travels between a first position in which it is beneath the stationary clamping surface and out of the way of a tree being placed in position for processing, to a second position forcing the tree into contact with the stationary surface. The movable element is shaped in such a way that the clamping force is applied along a line tending to force the tree into the intersection of the angled surface with an upstanding portion of the stationary clamping element over a wide range of tree diameters. For example, a typical harvester can handle trees from 3 inches in diameter through 14 inches in diameter. The angled clamping surface is formed on two spaced apart plates which are relatively thin so that they cut into the tree when a clamping force is applied by the movable element. This insures that most of the force applied by delimbing will be taken by these plates, rather than by the movable element.

The force applied by the movable element, the angle of the stationary surface, and the thickness of the plates, are selected so that although a log is clamped securely to the angled clamping surface to the extent of the spaced plates acting as knife edges cutting into the wood, the tree will still readily roll off the surface into the bunk when the movable element is released.

Other objects and advantages of the invention will become more apparent from the following description when taken in connection with the accompanying drawings, wherein:

DESCRIPTION OF THE DRAWINGS

Referring to FIG. 1, there is illustrated a tree length harvester, designated generally by the numeral 12, comprising a felling boom assembly 14, a processing boom assembly 16, a bunk 18, and an operator's cab 20, all of which are mounted on the frame of an articulated carrier 22.

Figure 1:
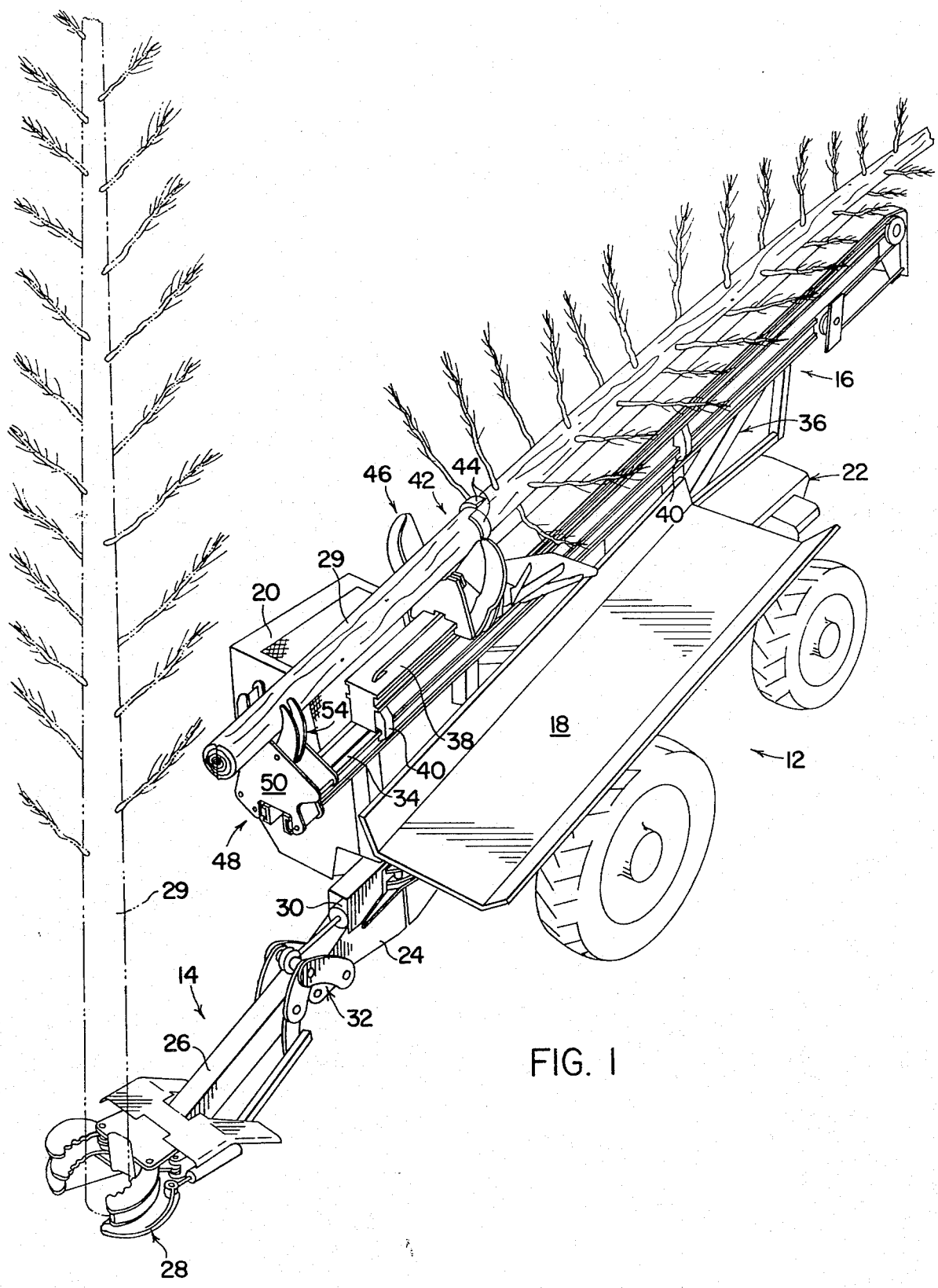
FIG. 1 is a perspective view of a tree harvester incorporating the invention.

The felling boom assembly 14 comprises an inner boom section 24, an outer boom section 26, and a felling head 28. The outer boom section 26 is pivotally attached to the inner boom section 24, and is moved from the felling position illustrated to a position for depositing a tree 29 on the processing boom by means of a hydraulic cylinder 30 acting between the carrier frame and a linkage assembly 32 connecting the inner and outer felling boom sections. Details of the felling boom assembly can be found in U.S. Pat. No. 3,896,862, and details of the felling head in U.S. Pat. No. 3,831,647.

The processing boom assembly 16 comprises a fixed boom section 34 mounted to the carrier frame by means of a support assembly 36, a movable boom section 38 mounted for linear movement relative to the fixed boom section 34 by means of roller supports 40, and a delimber head 42 mounted on rollers (not shown) for movement along the movable boom section 38. The movable boom section is moved relative to the fixed boom section and the delimbing head is moved relative to the movable boom section by a conventional system comprising a hydraulic cylinder (not shown) acting between the two boom sections and a system of reaved cables acting between the boom sections and the delimbing head.

The delimber head comprises a set of delimber blades 44 engageable with the trunk of a tree 29 to strip the branches off the tree as the delimber head moves along the movable boom, and a topping shear assembly 46 operable to cut off the top of the tree when a usable tree length has been delimbed.

Details of a processing boom assembly as described above can be found in U.S. Pat. No. 3,894,568 and will not be described further herein.

Figure 2:
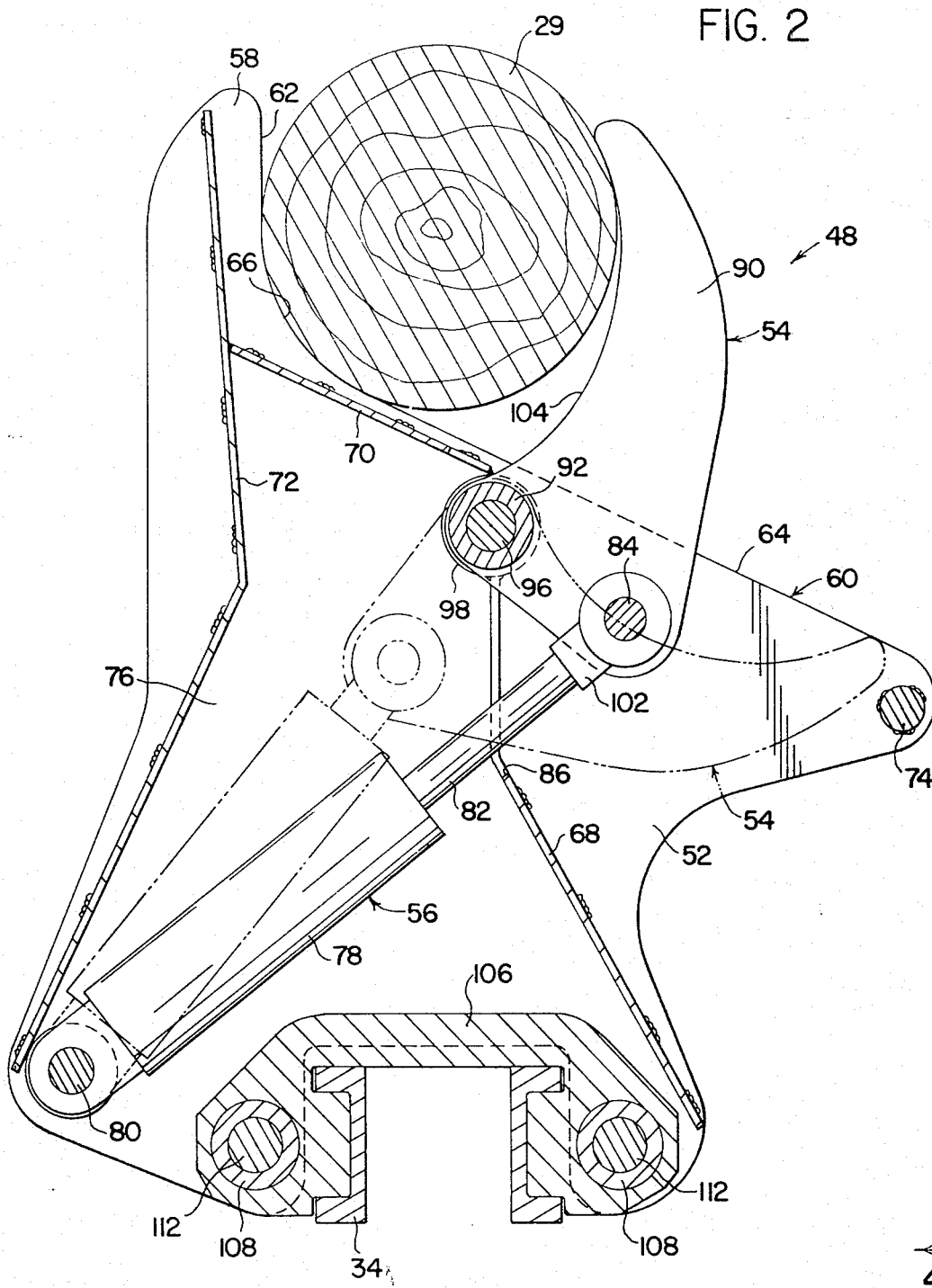
FIG. 2 is a sectional view of the invention shown in two positions of operation.
Figure 3:
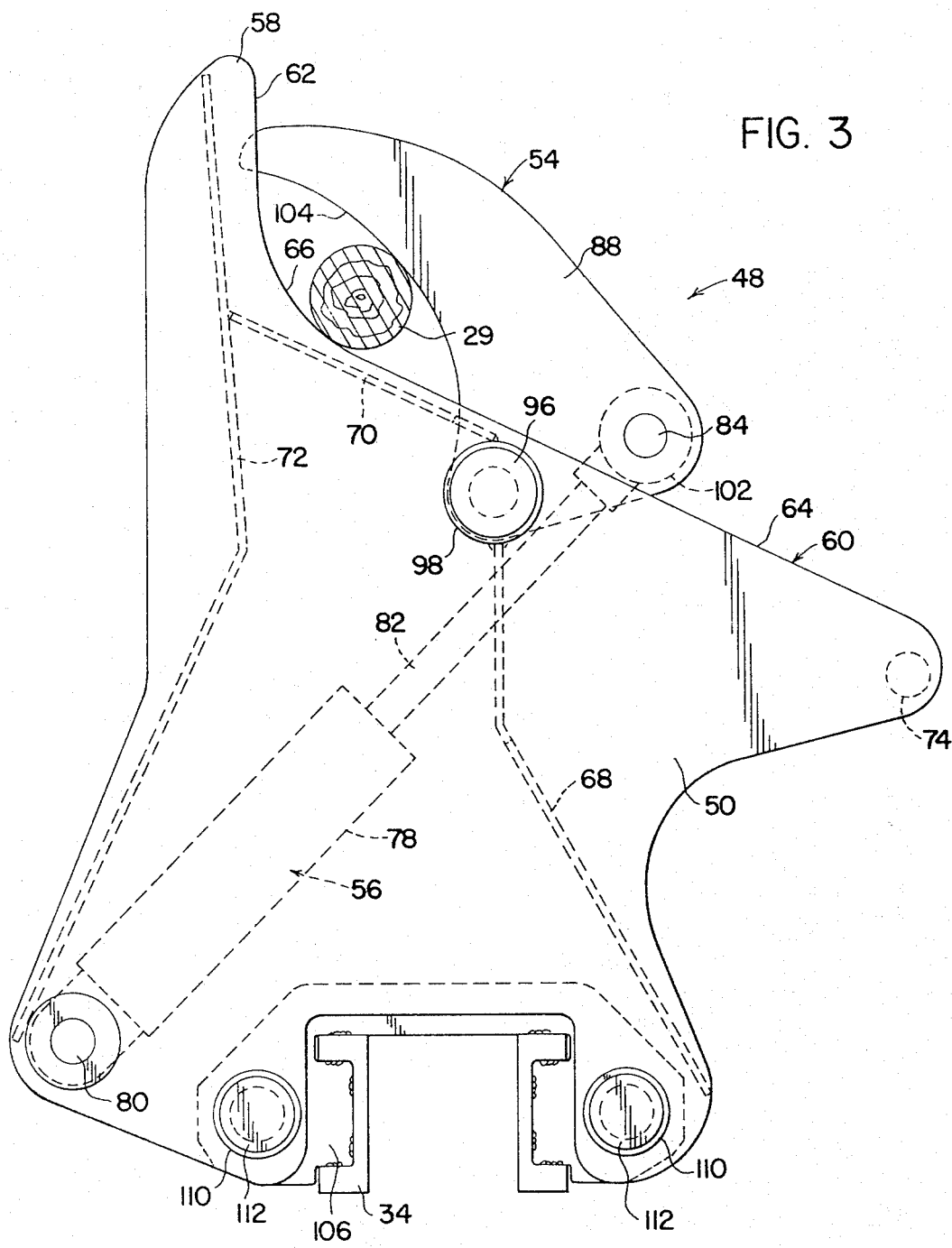
FIG. 3 is a front elevation view of the invention showing the invention in a third position of operation.
Figure 4:
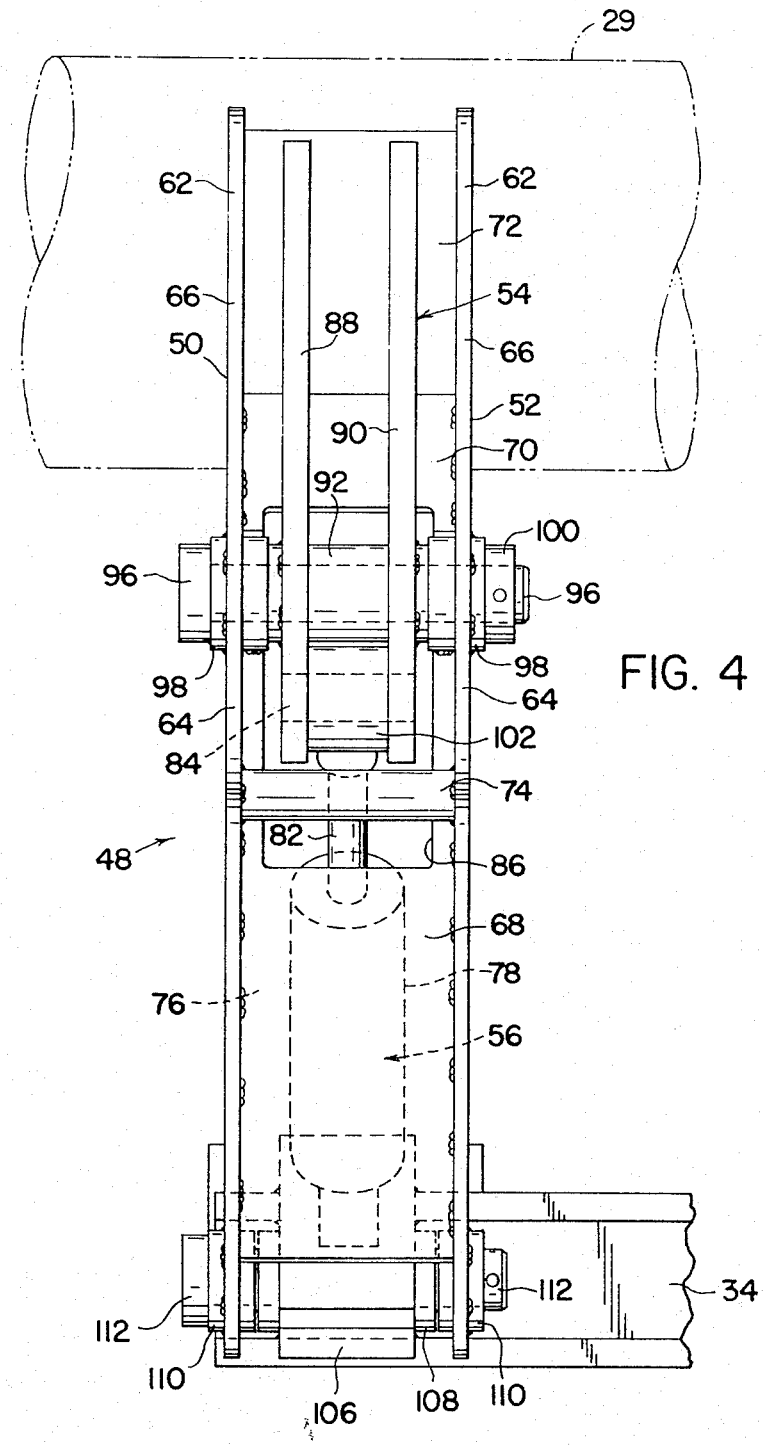
FIG. 4 is a side elevation view of the invention as viewed from line 4—4 of FIG. 2.

In accordance with the present invention a clamp assembly, designated generally by the numeral 48, is attached to the fixed boom section 34. Referring to FIGS. 2, 3 and 4 the clamp assembly comprises a pair of spaced frame plates 50, 52, a clamp arm assembly 54 located between the frame members 50, 52 and pivotally attached thereto, and a hydraulic cylinder 56 also located between and pivotally attached at one end to the frame plates 50, 52 and pivotally attached at the other end to the clamp arm.

Each of the spaced frame plates 50, 52 comprises a flat steel plate having an upwardly extending stationary clamp arm portion 58, and having a generally downwardly angled tree engaging surface 60 formed on an edge thereof. Viewing FIGS. 2 and 3, the tree engaging surface 60 is made up of two intersecting surface elements, a first surface element 62 formed on the stationary arm portion 58 and disposed essentially vertically, and a second surface element 64 forming an obtuse angle with the first surface element 62. The two tree engaging surface elements 62 and 64 are blended together with a relatively large radius arc 66.

The two frame members 50, 52 are separated by plate members 68, 70, 72, and a bar 74 welded to each frame member. The plate 70 and bar 74 are disposed just below the surface elements 62, 64 of each plate so that the tree engaging surface 60 is in the form of a knife edge capable of penetrating the surface of a tree in engagement therewith.

The plate members 68, 70, 72 combine with the frame plates 50, 52 to form a pocket or cavity 76, in which the cylinder 56 is mounted. In the illustrative embodiment, the cylinder body 78 is pivotally mounted at 80 to the frame plates 50, 52, and the piston rod 82 is pivotally attached to the movable clamp arm assembly 54 at 84. The outer plate 68 has a U-shaped cutout 86 formed in it to provide clearance for the piston rod 82.

Referring particularly to FIG. 4, the clamp arm 54 is made up of two identical plate members 88, 90 spaced apart along and welded to a cylindrical bearing member 92. A pivot pin 96 is received within the bearing member 92 and within bushing members 98 welded to the plates 50, 52 and retained axially by a collar 100 pinned thereto. A mounting member 102 is welded or otherwise attached to the free end of the piston rod 82, and is received between the two arm plates 88, 90 and pinned thereto in a conventional manner.

Referring specifically to FIG. 2, the movable arm assembly 54 is designed to be stored completely below the angled tree engaging surface 60 when in the open (broken line) position. This insures that the clamp arm 54 will not interfere in any way with the tree when it is being positioned for delimbing on the processing boom 16. Since the cylinder 56 is received within the cavity 76, with only the ram 82 extending outward when the clamp arm is closed, it is well-protected against damage by a tree being positioned on the processing boom, or by stray limbs and debris. Damage is most likely to occur when the clamp arm is in the open position; however, in this position the clamp arm assembly 54 effectively closes off the U-shaped opening 86, and the cavity 76 is essentially totally enclosed.

Each of the clamp arm plates 88, 90 has a concave tree engaging surface 104 formed thereon, which cooperates with the stationary tree engaging surfaces 60 to securely clamp trees over the entire range of the harvester's capability, as a comparison of the trees shown in FIGS. 2 and 3 illustrates. As the butt end of a tree is placed on the tree engaging surface 60, the cylinder 56 is pressurized, and the arm 54 is pivoted counter clockwise as shown in FIGS. 2 and 3 to engage the tree, tending to force it into the radius 66 intersecting the surface elements 62, 64.

The two arm plates 88, 90 which make up the clamp arm 54 are of somewhat thicker section than the frame plates 50, 52 to insure that when a tree is clamped between the arm 54 and the surface 60, only the surface 60 will penetrate the tree, thus substantially relieving the clamp arm 54 of the force applied to the tree by the delimber head as it moves along the tree, tending to pull the tree out of the clamp assembly.

The clamp assembly 48 is mounted on the fixed boom section 34 for easy attachment and removal to readily convert the harvester between single and multiple tree operation. A relatively massive mounting block 106 is welded or otherwise securely fixed to the fixed boom section 34. The mounting block is generally of inverted U-shaped configuration and has bushings 108 welded in place within holes formed in the legs of the U. The lower end of each of the frame members 50, 52 also forms an inverted U, having bushings 110 welded in place within holes formed in each leg, and the spaced frame members straddle the block 106 with the bushing bores in alignment. Pins 112 extend through the bushings to attach the clamp assembly to the boom section 34. Each of the pins 112 has a head formed at one end and a transverse hole at the other end to receive a cotter pin or the like to hold the pins in place axially once the clamp assembly is in place.

OPERATION

In operation, a tree 29, as shown in broken lines in FIG. 1, is gripped by the felling head 28, sheared, and then tilted backward by retracting the felling boom cylinder 30 to place the tree in the full line position of FIG. 1. At this point the clamp arm assembly 54 is in the broken line position of FIG. 2, and the movable boom 38 and delimbing head 42 are retracted to a position adjacent the clamp assembly 48.

When the tree is in place on the processing boom assembly 16, with the trunk of the tree contacting the tree engaging surface 60 and received within the delimbing blades 44 and top shear blades 46, the cylinder 56 is pressurized, extending rod 82 and closing the clamp arm 54 to clamp the tree between the tree engaging surfaces 60 and 104. The felling head 28 can then be opened and the felling boom retracted to start felling another tree while the first is being processed.

When the clamp arm 54 closes on the tree the edges of the frame plates 50, 52, which define the tree engaging surface 60, will penetrate the surface of the tree 29. As the movable boom 38 and the delimbing head are extended the delimbing blades 44 are closed against the tree, and the limbs are sheared off the trunk.

When the boom and delimbing head are fully extended, or when a minimum useable tree diameter is reached, the topping shear 46 is closed to shear off a delimbed, tree length log. The clamp assembly 54 is then opened to allow the processed log to roll down the surface element 64 and into the bunk 18. The angle of the surface element 64, the thickness of the plates 50, 52, and the force applied to the arm assembly 54 are all selected such that there is sufficient penetration of the wood surface to substantially relieve the arm of the delimbing forces, but not enough to prevent the tree from readily rolling down the surface element 64 once the clamp arm is moved to its open position.

I claim:

1. In apparatus for processing trees including a substantially horizontal processing boom, means for depositing a cut tree on said processing boom, and delimber means engageable with said cut tree and movable along said processing boom to delimb said tree:

a clamp assembly mounted on said processing boom in position to receive a tree deposited on said processing boom, said clamp assembly comprising a frame fixed to said boom; a first tree engaging surface formed on said frame at least a portion of which is disposed at an angle extending downwardly from the horizontal; a clamp arm pivotally mounted to said frame and having a second tree engaging surface formed thereon; and means for moving said clamp arm from a first position wherein said first and second tree engaging surfaces are spaced apart for deposit of a tree between them to a second position wherein said second tree engaging surface is in clamping engagement with a tree on said first tree engaging surface; the improvement wherein said clamp arm is located beneath said first tree engaging surface when said clamp arm is in its first position, to place said second tree engaging surface beneath said first tree engaging surface, whereby no portion of said clamp arm is in position to interfere with a tree being deposited on said processing boom.

2. Apparatus as claimed in claim 1, in which said first tree engaging surface is defined by a first substantially vertically oriented surface element, and a second surface element angled downwardly from the first element to form an obtuse angle therewith.

3. Apparatus as claimed in claim 1 including a bunk mounted adjacent said processing boom for deposit of processed trees therein, wherein said second surface element of said first tree engaging surface is angled downwardly toward said bunk to operate as a guide directing a processed tree into said bunk when said clamp arm is moved from its second position to its first position.

4. Apparatus as claimed in claim 1, in which said frame comprises first and second substantially vertical plates spaced apart along said processing boom and said clamp arm is disposed between said parallel plates.

5. Apparatus as claimed in claim 4, in which said parallel plates are spaced apart by a plurality of plates oriented to define a partially enclosed cavity between said plates, said means for moving said clamp arm being mounted within said cavity.

6. Apparatus as claimed in claim 5, in which said means for moving said clamp arm comprises a hydraulic cylinder, the body of said hydraulic cylinder being pivotally mounted to said parallel plates, and the ram of said cylinder being pivotally mounted to said clamp arm.

7. Apparatus as claimed in claim 6 in which the ram of said hydraulic cylinder extends through an opening formed in one of said plurality of plates defining said cavity, said clamp arm being positioned to essentially close said opening when said clamp arm is in its first position.

8. Apparatus as claimed in claim 7, in which said clamp arm comprises a pair of parallel plate members, with said second tree engaging surface being defined by an edge of each of said plates, said cylinder ram being pivotally connected to said clamp arm between said pair of plates.

9. Apparatus as claimed in claim 2, in which said clamp arm comprises a plate member having said second tree engaging surface formed on one edge thereof.

10. Apparatus as claimed in claim 9 in which said second tree engaging surface is a concave surface defined by said edge, said concave surface being operable in cooperation with said first tree engaging surface to tend to force a tree engaged between said first and second surfaces toward the intersection of said first and second surface elements.

11. Apparatus as claimed in claim 10 in which said frame comprises a first pair of spaced apart parallel plates with said first tree engaging surface being defined by an edge of each of said first pair of plates, and said clamp arm comprises a second pair of spaced apart parallel plates with said second tree engaging surface being defined by an edge of each of said second pair of plates.

* * * * *